US012084210B1

(12) United States Patent
Shen et al.

(10) Patent No.: US 12,084,210 B1
(45) Date of Patent: Sep. 10, 2024

(54) TILT ROTOR-BASED LINEAR MULTI-ROTOR UNMANNED AERIAL VEHICLE (UAV) STRUCTURE FOR CROP PROTECTION AND CONTROL METHOD THEREOF

(71) Applicant: JIANGSU UNIVERSITY, Zhenjiang (CN)

(72) Inventors: Yue Shen, Zhenjiang (CN); Jincheng Chu, Zhenjiang (CN); Zhixiang Shi, Zhenjiang (CN); Yayun Shen, Zhenjiang (CN); Lingfei Zhang, Zhenjiang (CN); Minghui Liu, Zhenjiang (CN); Dewei Wang, Zhenjiang (CN); Yicen Li, Zhenjiang (CN); Zhiwei Sun, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/283,233

(22) PCT Filed: Apr. 24, 2023

(86) PCT No.: PCT/CN2023/090241
§ 371 (c)(1),
(2) Date: Sep. 21, 2023

(87) PCT Pub. No.: WO2024/012000
PCT Pub. Date: Jan. 18, 2024

(30) Foreign Application Priority Data

Jul. 15, 2022 (CN) .......................... 202210834850.6

(51) Int. Cl.
*B64U 30/297* (2023.01)
*B64U 20/80* (2023.01)
(Continued)

(52) U.S. Cl.
CPC .......... *B64U 30/297* (2023.01); *B64U 20/80* (2023.01); *G05D 1/857* (2024.01);
(Continued)

(58) Field of Classification Search
CPC .. B64U 30/297; B64U 20/80; B64U 2101/40; B64U 2101/104; B64U 2101/00;
(Continued)

(56) References Cited

U.S. PATENT DOCUMENTS 8,733,690 B2 * 5/2014 Bevirt ................. B64C 29/0033
244/17.23
2016/0325829 A1 11/2016 Ahn et al.
(Continued)

FOREIGN PATENT DOCUMENTS

CN 112352759 A 2/2021
CN 214356673 U 10/2021
(Continued)

*Primary Examiner* — Benjamin P Lee
(74) *Attorney, Agent, or Firm* — Bayramoglu Law Offices LLC

(57) ABSTRACT

A tilt rotor-based linear multi-rotor unmanned aerial vehicle (UAV) structure for crop protection and a control method thereof are provided. The tilt rotor-based linear multi-rotor UAV structure for crop protection includes main lift power structures, tilt power structures, and a main frame structure, where the main frame structure is located in a middle; the main lift power structures are distributed at left and right ends of the main frame structure; and the tilt power structures are symmetrically distributed between the main frame structure and the main lift power structures. A vector power structure is adopted to ensure flexible attitude changes and smoother and more accurate UAV operations, and improve the operation efficiency. Meanwhile, the tilt rotor-based linear multi-rotor UAV structure is adapted to the complex working environment in China's ever-changing terrains.

5 Claims, 9 Drawing Sheets

(51) Int. Cl.
*G05D 1/85* (2024.01)
*B64U 101/40* (2023.01)
*G05D 107/20* (2024.01)
*G05D 109/25* (2024.01)

(52) U.S. Cl.
CPC .... *B64U 2101/40* (2023.01); *B64U 2201/104* (2023.01); *G05D 2107/21* (2024.01); *G05D 2109/254* (2024.01)

(58) Field of Classification Search
CPC .... B64U 2101/45; B64U 10/10; B64U 10/13; B64U 10/19; B64U 50/19; G05D 1/857; G05D 2107/21; G05D 2109/254; B64C 39/024; A01C 23/047; B64D 1/18
See application file for complete search history.

(56) References Cited

U.S. PATENT DOCUMENTS

| | | | | |
|---|---|---|---|---|
| 2017/0029099 A1* | 2/2017 | Chen | ............... | B64U 30/29 |
| 2017/0144771 A1* | 5/2017 | Lukaczyk | ............... | B64C 11/00 |
| 2018/0354609 A1* | 12/2018 | Renteria | ............... | B64C 11/46 |
| 2018/0354624 A1* | 12/2018 | Liu | ............... | A01C 23/047 |
| 2020/0346747 A1* | 11/2020 | Lukaczyk | ............... | B64U 30/26 |

FOREIGN PATENT DOCUMENTS

| | | |
|---|---|---|
| CN | 214824154 U | 11/2021 |
| CN | 113955114 A | 1/2022 |
| CN | 115258164 A | 11/2022 |

\* cited by examiner

TILT ROTOR-BASED LINEAR MULTI-ROTOR UNMANNED AERIAL VEHICLE (UAV) STRUCTURE FOR CROP PROTECTION AND CONTROL METHOD THEREOF

CROSS REFERENCE TO THE RELATED APPLICATIONS

This application is the national phase entry of International Application No. PCT/CN2023/090241, filed on Apr. 24, 2023, which is based upon and claims priority to Chinese Patent Application No. 202210834850.6, filed on Jul. 15, 2022, the entire contents of which are incorporated herein by reference.

TECHNICAL FIELD

The present disclosure relates to the field of unmanned aerial vehicle (UAV) control and agricultural crop protection, and in particular to a linear multi-rotor UAV for crop protection that adjusts an attitude through a tilt rotor, and a control method thereof.

BACKGROUND

In China, numerous recent technological changes in the agricultural field have promoted the country's transformation from a big agricultural country to an agricultural powerhouse. The strategies of intensive agriculture and precision agriculture require the integration of science and technology into agriculture. In the field of agricultural crop protection, with the emergence of crop protection unmanned aerial vehicles (UAVs), it has been widely recognized that crop protection UAVs are replacing traditional sprayers for field crop protection operations. Crop protection UAVs have higher operation efficiency than traditional sprayers and better spraying effect than manual spray. However, at present, there are still many problems in the practical application of crop protection UAVs.

At present, crop protection UAVs mainly include quadcopters, fixed-wing UAVs, helicopters, etc. The multi-rotor UAVs are driven by an electric motor, and have low cost. However, they have the disadvantages of small size, poor loading capacity, narrow spraying swath, obvious turbulence between rotors, and low operation efficiency, making them fail to meet the requirements of efficient and refined operations. The fixed-wing UAVs have the advantages of high flight altitude and long hang time, but they have the disadvantages of small down wash, poor droplet penetration, and low adhesion rate. In addition, fixed-wing UAVs need to be operated by professionally trained pilots, and generally cannot be operated by individual planters. The helicopters are driven by fuel, which can to some extent compensate for the shortcomings of multi-rotor and fixed-wing UAVs. However, they have the disadvantages of high cost and high maintenance prices in the later stage, and have higher requirements for the overall quality of pilots, which puts great economic pressure on farmers. Chinese patent application CN202023305357.0 proposes a linear multi-rotor aircraft for crop protection. The aircraft adopts a linear structure, effectively expanding the spraying swath and reducing the rotor turbulence effect. However, the control of the aircraft is difficult, requiring a plurality of attitude adjustment motors to maintain attitude stability, resulting in poor energy utilization.

SUMMARY

In view of the above problems, the present disclosure proposes a linear tilt-rotor unmanned aerial vehicle (UAV) for crop protection and a control method thereof. The present disclosure adopts a tilt structure and effectively combines the wide spraying swath of a linear aircraft and high energy utilization of a fixed-wing UAV, meeting the needs of modern agriculture. The present disclosure directly increases the spraying area of the UAV through a linear mechanical structure, and effectively reduces interference through a linear rotor layout, thereby making a down wash of rotors uniform for full operation and reducing pesticide waste caused by repeated operations. In addition, the present disclosure adopts a tilt rotor structure motor, which achieves high energy utilization and flexible attitude changes, and ensures smooth and accurate UAV operation.

The present disclosure provides a tilt rotor-based linear multi-rotor UAV for crop protection. The UAV for crop protection is mainly designed for large-scale continuous operation scenarios on scattered planting plots in China, achieving large one-time spraying swath and high operation efficiency.

The present disclosure adopts the following technical solutions. A tilt rotor-based linear multi-rotor UAV structure for crop protection includes main lift power structures, tilt power structures, and a main frame structure, where the main frame structure is located in a middle; the main lift power structures are distributed at left and right ends of the main frame structure; and the tilt power structures are symmetrically distributed between the main frame structure and the main lift power structures;

the main lift power structures each include a main lift blade 1, a main lift motor 2, a main lift motor fixing plate 3, a main lift electronic speed controller 4, first tube clamps 5, a centrifugal nozzle 6, two slave-control fixing plates 7, a main lift slave-control circuit board 8, and a main rod 9; the main lift blade 1 is screwed to the main lift motor 2; the main lift motor 2 is screwed to the main lift motor fixing plate 3, is clamped through the first tube clamps, and is fixed to the main rod 9 together with the centrifugal nozzle 6 below; the main lift electronic speed controller 4 and the main lift slave-control circuit board 8 are respectively fixed to the two slave-control fixing plates 7, and are fixed to the main rod 9 through the first tube clamps; the main lift slave-control circuit board 8 is configured to receive a command from a control board 26 and provide a signal to the main lift electronic speed controller 4 to drive the main lift motor 2 to rotate; and the centrifugal nozzle 6 is internally integrated with a motor speed controller, and directly drives a speed control through a pulse width modulation (PWM) signal received from the main lift slave-control circuit board 8;

the tilt power structures each include two tilt carbon plates 10, a tilt slave-control circuit board 11, a servo fixing aluminum part 12, a servo 13, a tilt electronic speed controller 14, two clamping aluminum parts 15, second tube clamps, a tilt motor fixing plate 17, a bearing fixing aluminum part 18, a tilt carbon tube 19, two bearings 20, a tilt motor 21, and a tilt blade 22; the tilt slave-control circuit board 11 and the tilt electronic speed controller 14 are respectively screwed to upper parts of the two tilt carbon plates 10; the upper parts of the two tilt carbon plates 10 are fixed to the main rod 9 through the first tube clamps; the tilt carbon tube 19 is provided at a middle part between lower ends of the two tilt carbon plates 10; two ends of the tilt carbon tube 19 are fixed by the two bearings 20 and two of the second tube clamps; the bearing fixing aluminum part 18 is configured to fix the two bearings 20; the two clamping aluminum parts 15 jointly clamp the tilt carbon tube 19; the tilt carbon tube 19 is provided with a perforation such that fixing positions of the clamping aluminum parts 15 are relatively consistent; the servo fixing aluminum part 12 is located at a position close to one end of the tilt carbon tube 19; the servo fixing aluminum part 12 is configured to fix the servo 13; an output shaft of the servo 13 is nested in a groove of the clamping aluminum part 15 to drive the tilt carbon tube 19 to rotate; the tilt blade 22 is fixed to the tilt motor 21 through a nut; and the tilt motor fixing plate 17 is provided with a tilt motor 21 mounting hole to connect and fix two of the second tube clamps to the tilt carbon tube 19; and the main frame structure includes a level gauge 23, an inertial navigation module 24, a shock pad 25, the control board 26, a global positioning system (GPS) antenna 27, a program downloader 28, a remote control receiver 29, tees 30, a small battery 31, a small battery fixing plate 32, a water pump fixing plate 33, a water pump 34, an onboard battery 35, a battery fixing plate 36, a crossbar 37, a latch plate 38, a water tank fixing plate 39, two undercarriage carbon tubes 40, a water tank 41, a water level gauge 42, landing carbon tubes 43, and two fixed carbon plates 44; the inertial navigation module 24, the program downloader 28, the remote control receiver 29, and the water level gauge 42 are connected to the control board 26 through an interface on the control board 26 to transmit data to the control board 26; the small battery 31 is configured to supply power to the control board 26, the inertial navigation module 24, and the water level gauge 42 through a battery interface on the control board 26; the level gauge 23, the shock pad 25, the control board 26, the GPS antenna 27, the program downloader 28, and the remote control receiver 29 are screwed and hardwired to the two fixed carbon plates 44; the two undercarriage carbon tubes 40 are fixedly connected to the main rod 9 through the tees 30; the two fixed carbon plates 44 are fixed to the main rod 9 through four of the first tube clamps, screws, and nuts; the water pump fixing plate 33 is fixed to one of the undercarriage carbon tubes 40 through two of the first tube clamps, and is provided with a water pump 34 positioning and mounting hole for convenience of fixing the water pump 34; the small battery 31 is bound to the small battery fixing plate 32 through a battery strap for convenience of quick replacement; the small battery fixing plate 32 is fixed to the main rod 9 through two of the first tube clamps; the latch plate 38 and the water tank fixing plate 39 are provided with same tube clamp positioning holes, and are fixed to the crossbar 37 through four of the first tube clamps; the crossbar 37 is connected to the undercarriage carbon tubes 40 through the tees 30; the onboard battery 35 serves as a main power supply module of the UAV, and is fixed to the battery fixing plate 36 through a battery tie; the battery fixing plate 36 is connected to the latch plate 38 through a sliding groove; the water tank fixing plate 39 is provided with a water tank 41 positioning and mounting hole for convenience of fixing the water tank; the water level gauge 42 is located at a bottom of the water tank 41, and is configured to measure a water level of the water tank based on an ultrasonic principle; and the two undercarriage carbon tubes 40 are respectively fixedly connected to the landing carbon tubes 43 through two of the tees 30 for landing cushioning of the UAV.

Further, the clamping aluminum parts 15 each adopt a long rudder arm structure to effectively reduce gear wear caused by high-frequency rotation of the servo 13; and the tilt carbon plates 10 offer enough space to facilitate 360-degree rotation of the clamping aluminum parts 15 connected to the servo 13.

Further, the inertial navigation module 24 is bonded to the shock pad 25 through a three-layer damping material; the level gauge 23 is responsible for zero deviation calibration of an initial angle of the UAV; the GPS antenna 27 is provided for the inertial navigation module 24 to receive global navigation satellite system (GNSS) data; the program downloader 28 is responsible for software testing of the UAV; and the remote control receiver 29 is responsible for receiving a remote control command and transmitting data to the control board 26.

Further, the latch plate 38 is provided with a sliding groove structure, and a positioning hole for lifting and pulling a latch, for convenience of quick battery replacement.

The present disclosure further provides a control method of the tilt rotor-based linear multi-rotor UAV structure for crop protection, including the following steps:

step 1: establishing a three-axis rotational dynamic model and a three-axis translational dynamic model of a UAV separately;

step 2: initializing a master control chip and an external sensor;

step 3: performing self-check of the external sensor of the UAV; displaying an alarm through an external light strip and repeating the step 3 if the self-check indicates that the external sensor is not normal; and proceeding to step 4 if the self-check indicates that the external sensor is normal;

step 4: waiting for human-machine interactive unlocking such that the UAV switches from a self-locked state to a state of waiting for takeoff, step 5: receiving human-machine interaction data, and switching the UAV among different missions, specifically among an attitude mode, a fixed-altitude mode, a fixed-point mode, and a one-click landing mode; forcibly switching the UAV from the fixed-point mode to the fixed-altitude mode when a GPS signal is weak or lost; allowing the UAV to read and control information concerning an attitude angle and an angular speed in the attitude mode; allowing the UAV to read and control information concerning the attitude angle, the angular speed, a speed, and a flight altitude in the fixed-altitude mode; allowing the UAV to read and control information concerning the attitude angle, the angular speed, the speed, and a position and implement track planning and tracking functions in the fixed-point mode; allowing the UAV to end a current mission and slowly descend in place in the one-click landing mode; adopting a composite control mode combining proportional-integral-derivative (PID) control and auto-disturbance rejection control (ADRC) and combining cascade control and parallel control, according to the dynamic models of the UAV established in the step 1; and adopting a master-slave control strategy based on controller area network (CAN) communication to address a problem that a control signal is easy to lose due to an excessively long body of the unmanned aerial vehicle; and step 6: turning off system control after the UAV safely lands, and returning to the step 4.

In the present disclosure, the main lift blade 1 is a 32-inch carbon fiber composite blade responsible for providing a continuous and stable down wash and lift. The main lift motor 2 is fixed horizontally and provides power to the main lift blade 1. To address the problem of coupling caused by different motor rotations, the main lift motor 2 is set to have the same speed but an opposite rotation direction to eliminate the coupling. In the present disclosure, the tilt blade 22 is a 22-inch carbon fiber composite blade responsible for providing lift for pitch and yaw changes. The tilt motor 21 is fixed to the tilt motor fixing plate 17 through a screw and a nut, and is fixed to the tilt carbon tube 19 through a 25 mm tube clamp 16, ensuring that the motor rotates coaxially with the servo. The servo is controlled to drive the motor to change direction, so as to complete changes in pitch and yaw angles, increasing the flexibility and endurance of the entire UAV. A middle of the body is provided with the undercarriage carbon tubes 40, providing a stable point for takeoff and landing. The onboard battery 35 is stored at an upper end of the battery fixing plate 36 extended from a horizontal carbon rod of a rack, and a pesticide box 41 is fixed at a lower end of a plane, ensuring that a center of gravity of the entire UAV is located at a middle and lower side of the main rod, which is conducive to balance control.

The linear multi-rotor UAV for crop protection adopts a 3-meter-long carbon tube as the main rod 9 for use as a main load-bearing and moving platform, resulting in a long signal line layout susceptible to interference. In view of this, the present disclosure adopts a master-slave interactive control based on CAN bus communication. The control board 26 is a master control board responsible for perception, computation, and control. The tilt slave-control circuit board 11 receives commands from the master control board through a CAN bus to directly control the motor and the servo to make corresponding actions.

In the present disclosure, the control mode is a composite control mode combining PID and ADRC and combining cascade control and parallel control. The linear multi-rotor UAV for crop protection can directly acquire a corresponding force in an X-direction by adjusting the tilt rotor, not like an ordinary multi-rotor UAV that can only acquire the force by adjusting a corresponding attitude angle. In the present disclosure, the control mode specifically divides an attitude control and a position control of the linear multi-rotor UAV for crop protection into two independent control systems. Each control structure adopts a cascade feedback control, and two control results are combined to form a parallel control. The attitude control is implemented through an angle controller, an angular speed controller, and an angular acceleration controller in cascade. Angle data and angular speed data are estimated by an integrated navigation algorithm. Angular acceleration data is estimated by a differential tracker in the ADRC algorithm. Similar to the attitude control, the position control is implemented through a position controller, a speed controller, and an acceleration controller in cascade. Position information and speed information are estimated by the integrated navigation algorithm, while acceleration information is estimated by the differential tracker.

The present disclosure is mainly applied to the pesticide spraying and crop seeding during crop protection operations, targeting various complex terrains such as plains, mountains, and hills according to the requirements of multi-directional autonomous operation. Unlike the current multi-rotor crop protection UAVs on the market, the present disclosure adopts a linear flight structure different from traditional UAVs. Two main lift motors 2 and two tilt motors 21 are evenly spaced to ensure uniform distribution of the down wash, reduce turbulence between the rotors, and allow droplets to penetrate while adhering more evenly to the crop canopy. Different operating modes are provided for different operating scenarios. For small plots or rugged terrains, a single-UAV operating mode is adopted, manually controlled by the pilot. In this mode, a pesticide box and a battery that match the plot are carried to directly complete the crop protection mission, which reflect the flexibility and operability of the crop protection operation. For large plots, the length of the main rod is adjusted according to operational needs, and the spraying swath is flexibly increased according to the site specifications to improve operation efficiency.

Compared to a traditional UAV for crop protection, the present disclosure has the following innovative points.

(1) The present disclosure adopts a linear power distribution layout, including main lift power structures, tilt power structures, and a main frame structure. The main frame structure is located in a middle. The main lift power structures are distributed at left and right ends of the main frame structure. The tilt power structures are symmetrically distributed between the main frame structure and the main lift power structures. The present disclosure reduces the turbulence between the rotors, expands the spraying swath, and makes the down wash of the rotors uniform for full operation, reducing pesticide waste caused by repeated operations and achieving a desired operation effect.

(2) The present disclosure adopts a vector power structure, which ensures flexible attitude changes and smoother and more accurate UAV operations, and improves the operation efficiency. Meanwhile, the present disclosure is adapted to the complex working environment in China's ever-changing terrains.

(3) The present disclosure adopts the master-slave interactive control to ensure that the long-distance communication is not vulnerable to interference, and reduces the systemic risk through a real-time monitoring and inspection algorithm.

BRIEF DESCRIPTION OF THE DRAWINGS

FIG. 3A is a schematic diagram of one side of the tilt power structure, and FIG. 3B is a schematic diagram of the other side of the tilt power structure;

Reference numerals: FIG. 2: 1. main lift blade; 2. main lift motor; 3. main lift motor fixing plate; 4. main lift electronic speed controller; 5. 40 mm tube clamp; 6. centrifugal nozzle; 7. slave-control fixing plate; 8. main lift slave-control circuit board; and 9. main rod;

FIGS. 3A-3B: 10. tilt carbon plate; 11. tilt slave-control circuit board; 12. servo fixing aluminum part; 13. servo; 14. tilt electronic speed controller; 15. clamping aluminum part; 16. 25 mm tube clamp; 17. tilt motor fixing plate; 18. bearing fixing aluminum part; 19. tilt carbon tube; 20. bearing; 21. tilt motor; and 22. tilt blade;

FIG. 4: 23. level gauge; 24. inertial navigation module; 25. shock pad; 26. control board; 27. GPS antenna; 28. program downloader; and 29. remote control receiver; and FIG. 5: 30. tee; 31. small battery; 32. small battery fixing plate; 33. water pump fixing plate; 34. water pump; 35. onboard battery; 36. battery fixing plate; 37. crossbar; 38. latch plate; 39. water tank fixing plate; 40. undercarriage carbon tube; 41. water tank; 42. water level gauge; 43. landing carbon tube; and 44. fixed carbon plate.

DETAILED DESCRIPTION OF THE EMBODIMENTS

Figure 1:
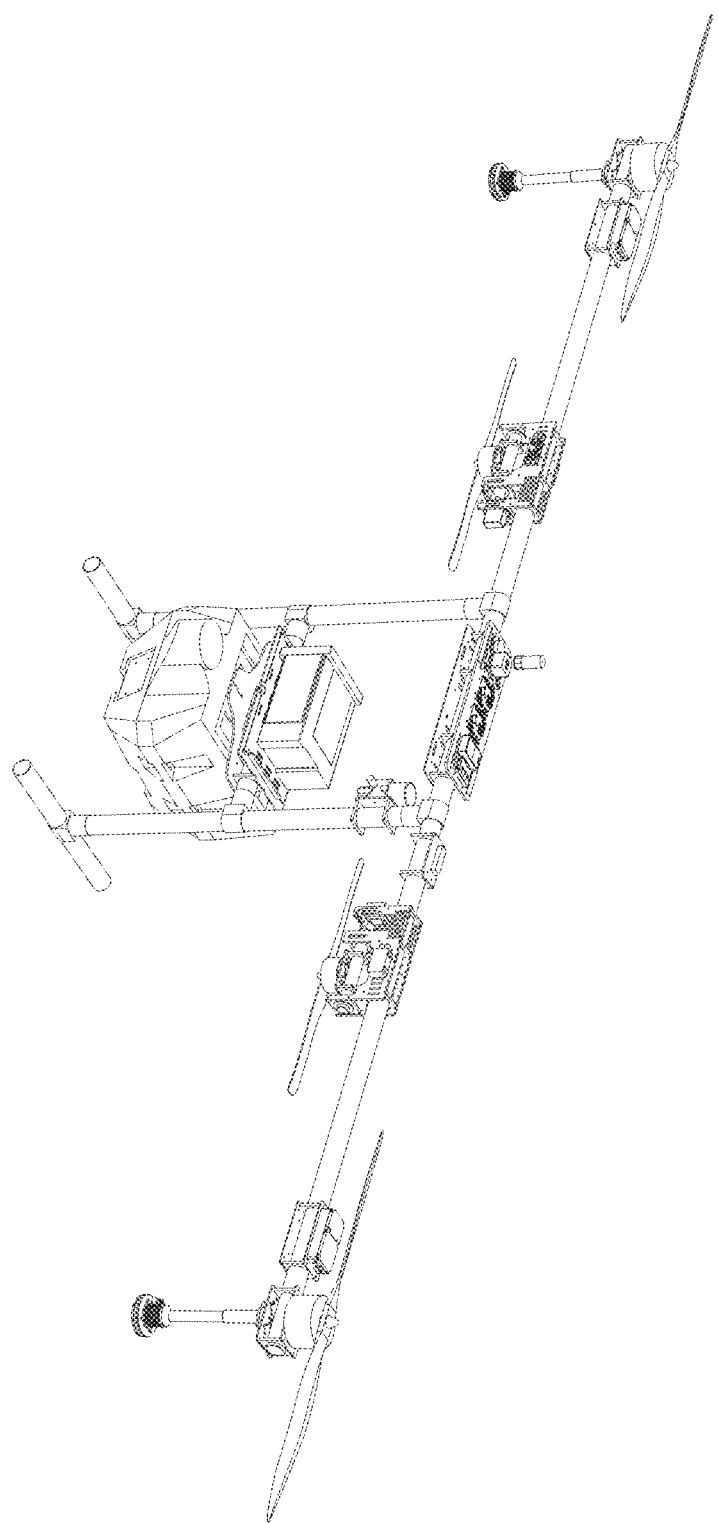
FIG. 1 is an overall structural diagram of a tilt rotor-based linear multi-rotor UAV structure for crop protection according to the present disclosure.

The present disclosure provides a tilt rotor-based linear multi-rotor UAV structure for crop protection. The tilt rotor-based linear multi-rotor UAV structure for crop protection includes main lift power structures, tilt power structures, and a main frame structure. the main lift power structures each include a main lift blade 1, a main lift motor 2, a main lift motor fixing plate 3, a main lift electronic speed controller 4, 40 mm tube clamps 5 (first tube clamps), a centrifugal nozzle 6, two slave-control fixing plates 7, a main lift slave-control circuit board 8, and a carbon fiber main rod 9. The main lift blade 1 is preferably a 32-inch blade, and is screwed to the main lift motor 2. The main lift motor 2 is screwed to the main lift motor fixing plate 3, is clamped through the 40 mm tube clamps 5, and is fixed to the main rod 9 together with the centrifugal nozzle 6. The main lift motor fixing plate 3 is compatible with most motor mounting holes on the market, and has a certain degree of universality. The centrifugal nozzle 6 is suitable for various pesticides, and features adjustable atomization and quick replacement, effectively improving crop protection efficiency. The main lift electronic speed controller 4 and the main lift slave-control circuit board 8 are respectively fixed to the two slave-control fixing plates 7, and are fixed to the main rod 9 through the 40 mm tube clamps 5, preventing the rotation of the main lift blade 1 from being interfered. A single main lift slave-control circuit board 8 can control one main lift motor 2 and one centrifugal nozzle 6. The main lift slave-control circuit board 8 is configured to receive a command from a control board 26 and provide a signal to the main lift electronic speed controller 4 to drive the main lift motor 2 to rotate. The centrifugal nozzle 6 is internally integrated with a motor speed controller, and directly drives a speed control through a pulse width modulation (PWM) signal received from the main lift slave-control circuit board 8.

The tilt power structures each include two tilt carbon plates 10, a tilt slave-control circuit board 11, a servo fixing aluminum part 12, a servo 13, a tilt electronic speed controller 14, two clamping aluminum parts 15, 25 mm tube clamps 16, a tilt motor fixing plate 17, a bearing fixing aluminum part 18, a tilt carbon tube 19, two bearings 20, a tilt motor 21, and a tilt blade 22. The tilt slave-control circuit board 11 and the tilt electronic speed controller 14 are respectively screwed to the two tilt carbon plates 10. The two tilt carbon plates 10 are fixed to the main rod 9 through the 40 mm tube clamps 5. The tilt carbon tube 19 is provided at a middle part between the two tilt carbon plates through the two bearings 20 and two 25 mm tube clamps (second tube clamps). The bearings are standard bearings with an inner diameter of 25 mm and an outer diameter of 37 mm, which facilitates the rotation of the servo 13. The two clamping aluminum parts 15 jointly clamp the tilt carbon tube 19. The tilt carbon tube 19 is provided with a perforation such that fixing positions of the clamping aluminum parts 15 are relatively consistent. An output shaft of the servo 13 is nested in a groove of the clamping aluminum part 15 to drive the tilt carbon tube 19 to rotate. The clamping aluminum parts 15 each adopt a long rudder arm structure to effectively reduce gear wear caused by high-frequency rotation of the servo 13. The tilt carbon plates 10 offer enough space to facilitate 360-degree rotation of the clamping aluminum parts 15 connected to the servo 13. The tilt blade 22 is fixed to the tilt motor 21 through a nut. The tilt motor fixing plate 17 is provided with a tilt motor 21 mounting hole to connect and fix two of the 25 mm tube clamps 16 to the tilt carbon tube 19.

The main frame structure includes a level gauge 23, an inertial navigation module 24, a shock pad 25, the control board 26, a global positioning system (GPS) antenna 27, a program downloader 28, a remote control receiver 29, tees 30, a small battery 31, a small battery fixing plate 32, a water pump fixing plate 33, a water pump 34, an onboard battery 35, a battery fixing plate 36, a crossbar 37, a latch plate 38, a water tank fixing plate 39, two undercarriage carbon tubes 40, a water tank 41, a water level gauge 42, landing carbon tubes 43, and two fixed carbon plates 44. The level gauge 23, the shock pad 25, the control board 26, the GPS antenna 27, the program downloader 28, and the remote control receiver 29 are screwed and hard-wired to the two fixed carbon plates 44. The inertial navigation module 24 is bonded to the shock pad 25 through a three-layer damping material. The level gauge 23 is responsible for zero deviation calibration of an initial angle of the UAV. The GPS antenna 27 is provided for the inertial navigation module 24 to receive global navigation satellite system (GNSS) data. The program downloader 28 is responsible for software testing of the UAV. The remote control receiver 29 is responsible for receiving a remote control command and transmitting data to the control board 26. The two undercarriage carbon tubes 40 are fixedly connected to the main rod 9 through the tees 30. The two fixed carbon plates 44 are fixed to the main rod 9 through four of the 40 mm tube clamps 5, screws, and nuts. The water pump fixing plate 33 is fixed to one of the undercarriage carbon tubes 40 through two of the 40 mm tube clamps 5, and is provided with a water pump 34 positioning and mounting hole for convenience of fixing the water pump 34. The small battery 31 is bound to the small battery fixing plate 32 through a battery strap for convenience of quick replacement. The small battery fixing plate 32 is fixed to the main rod 9 through two of the 40 mm tube clamps 5. The latch plate 38 and the water tank fixing plate 39 are provided with same tube clamp positioning holes, and are fixed to the crossbar 37 through four of the 40 mm tube clamps 5. The crossbar 37 is connected to the undercarriage carbon tubes 40 through the tees 30. The latch plate 38 is provided with a sliding groove structure, and a positioning hole for lifting and pulling a latch, for convenience of quick battery replacement. The onboard battery 35 serves as a main power supply module of the UAV, and is fixed to the battery fixing plate 36 through a battery tie. The battery fixing plate 36 is connected to the latch plate 38 through a sliding groove. The water tank fixing plate 39 is provided with a water tank 41 positioning and mounting hole for convenience of fixing the water tank. The water level gauge 42 is located at a bottom of the water tank 41, and is configured to measure a water level of the water tank based on an ultrasonic principle. The two undercarriage carbon tubes 40 are respectively fixedly connected to the landing carbon tubes 43 through two of the tees 30 for landing cushioning of the UAV The present disclosure is further described below with reference to the drawings and embodiments.

FIG. 1 is an overall structural diagram of a tilt rotor-based linear multi-rotor UAV structure for crop protection according to the present disclosure. The present disclosure uses a carbon fiber tube with a length of 3 m and a diameter of 40 mm as a main body, symmetrically provided with two tilt structures perpendicular to the body downwards, improving the wind field utilization of the tilt blade 22.

Figure 2:
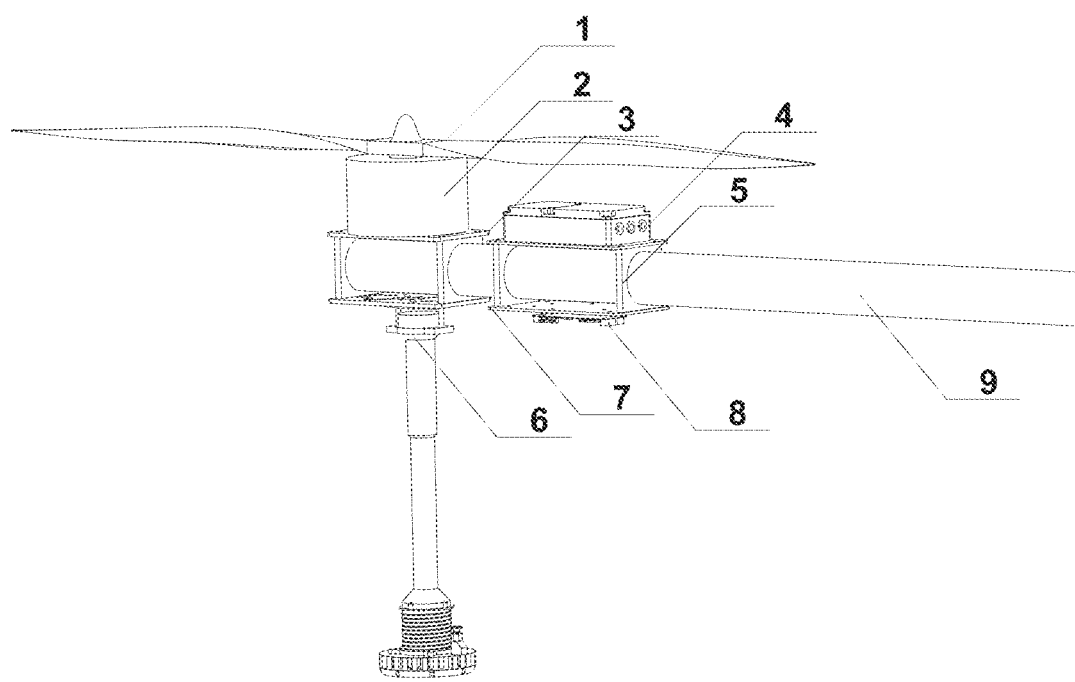
FIG. 2 is a schematic diagram of a main lift rotor component connected to a boom according to the present disclosure.

FIG. 2 is a schematic diagram of a main lift power structure according to the present disclosure. The main lift blade 1 is preferably a 32-inch blade, which is a main source of lift. The main lift motor 2 is screwed to the main lift motor fixing plate 3, is clamped through the 40 mm tube clamps 5, and is fixed to the main rod 9 together with the centrifugal nozzle 6. The main lift motor fixing plate 3 is compatible with most motor mounting holes on the market, and has a certain degree of universality. The centrifugal nozzle 6 is suitable for various pesticides, and features adjustable atomization and quick replacement, effectively improving crop protection efficiency. The main lift electronic speed controller 4 and the main lift slave-control circuit board 8 are respectively fixed to the two slave-control fixing plates 7, and are fixed to the main rod 9 through the 40 mm tube clamps 5, preventing the rotation of the main lift blade 1 from being interfered. A single main lift slave-control circuit board 8 can control one main lift motor 2 and one centrifugal nozzle 6. The main lift slave-control circuit board 8 is configured to receive a command from a control board 26 and provide a signal to the main lift electronic speed controller 4 to drive the main lift motor 2 to rotate. The centrifugal nozzle 6 is internally integrated with a motor speed controller, and directly drives a speed control through a pulse width modulation (PWM) signal received from the main lift slave-control circuit board 8.

Figure 3A:
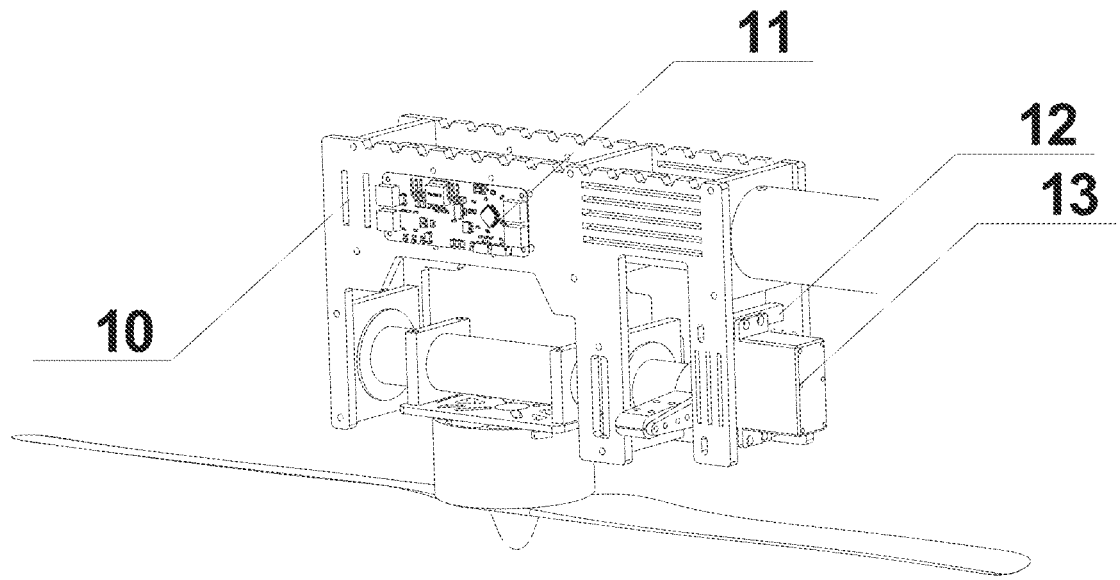
FIGS. 3A-3B are schematic diagrams of a tilt power structure according to the present disclosure, where
Figure 3B:
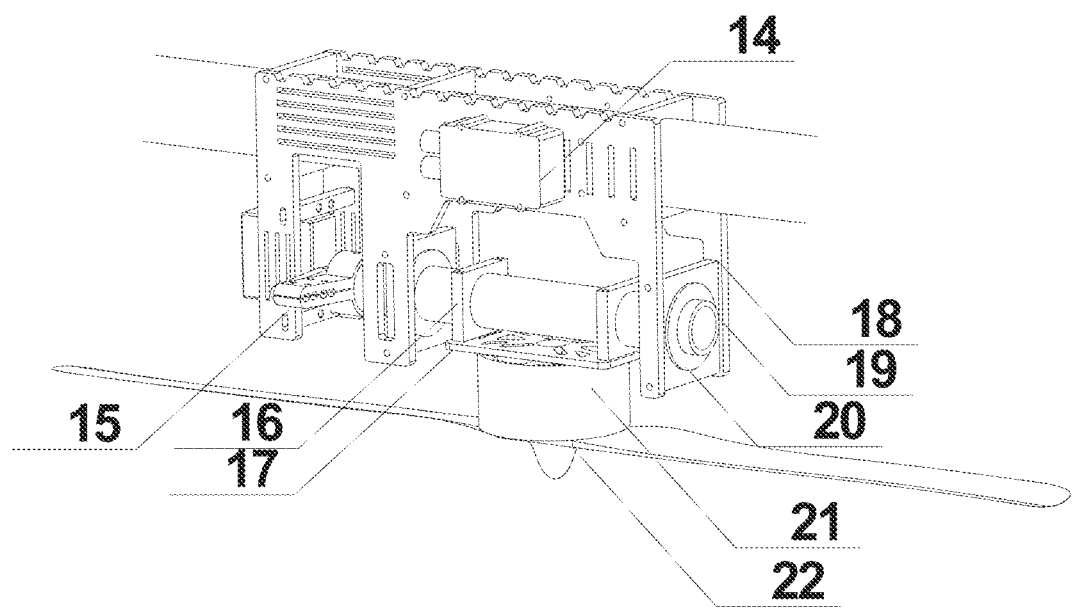

FIGS. 3A-3B are schematic diagrams of a tilt power structure according to the present disclosure. In the present disclosure, the tilt slave-control circuit board 11 and the tilt electronic speed controller 14 are respectively screwed to the two tilt carbon plates 10. The two tilt carbon plates 10 are fixed to the main rod 9 through the 40 mm tube clamps 5. The tilt carbon tube 19 is provided at a middle part between the two tilt carbon plates through the two bearings 20 and two 25 mm tube clamps. The bearings are standard bearings with an inner diameter of 25 mm and an outer diameter of 37 mm, which facilitates the rotation of the servo 13. The two clamping aluminum parts 15 jointly clamp the tilt carbon tube 19. The tilt carbon tube 19 is provided with a perforation such that fixing positions of the clamping aluminum parts 15 are relatively consistent. An output shaft of the servo 13 is nested in a groove of the clamping aluminum part 15 to drive the tilt carbon tube 19 to rotate. The clamping aluminum parts 15 each adopt a long rudder arm structure to effectively reduce gear wear caused by high-frequency rotation of the servo 13. The tilt carbon plates 10 offer enough space to facilitate 360-degree rotation of the clamping aluminum parts 15 connected to the servo 13. The tilt blade 22 is fixed to the tilt motor 21 through a nut. The tilt motor fixing plate 17 is provided with a tilt motor 21 mounting hole to connect and fix two of the 25 mm tube clamps 16 to the tilt carbon tube 19.

Figure 4:
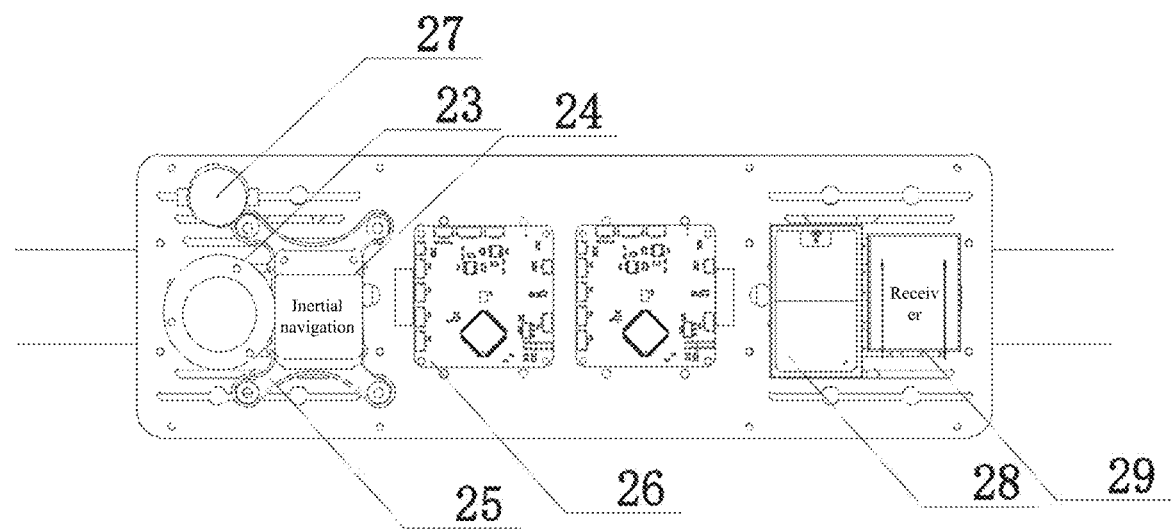
FIG. 4 is a schematic diagram of a specific structure of an upper part of a main frame structure according to the present disclosure.

FIG. 4 is a schematic diagram of a specific structure of an upper part of a main frame structure, which is a main control and test module, according to the present disclosure. The level gauge 23, the shock pad 25, the control board 26, the GPS antenna 27, the program downloader 28, and the remote control receiver 29 are hard-wired to the two fixed carbon plates 44. The inertial navigation module 24 is bonded to the shock pad 25 through a three-layer damping material. The level gauge 23 is responsible for zero deviation calibration of an initial angle of the UAV. The GPS antenna 27 is provided for the inertial navigation module 24 to receive global navigation satellite system (GNSS) data. The program downloader 28 is responsible for software testing of the UAV. The remote control receiver 29 is responsible for receiving a remote control command and transmitting data to the control board 26.

Figure 5:
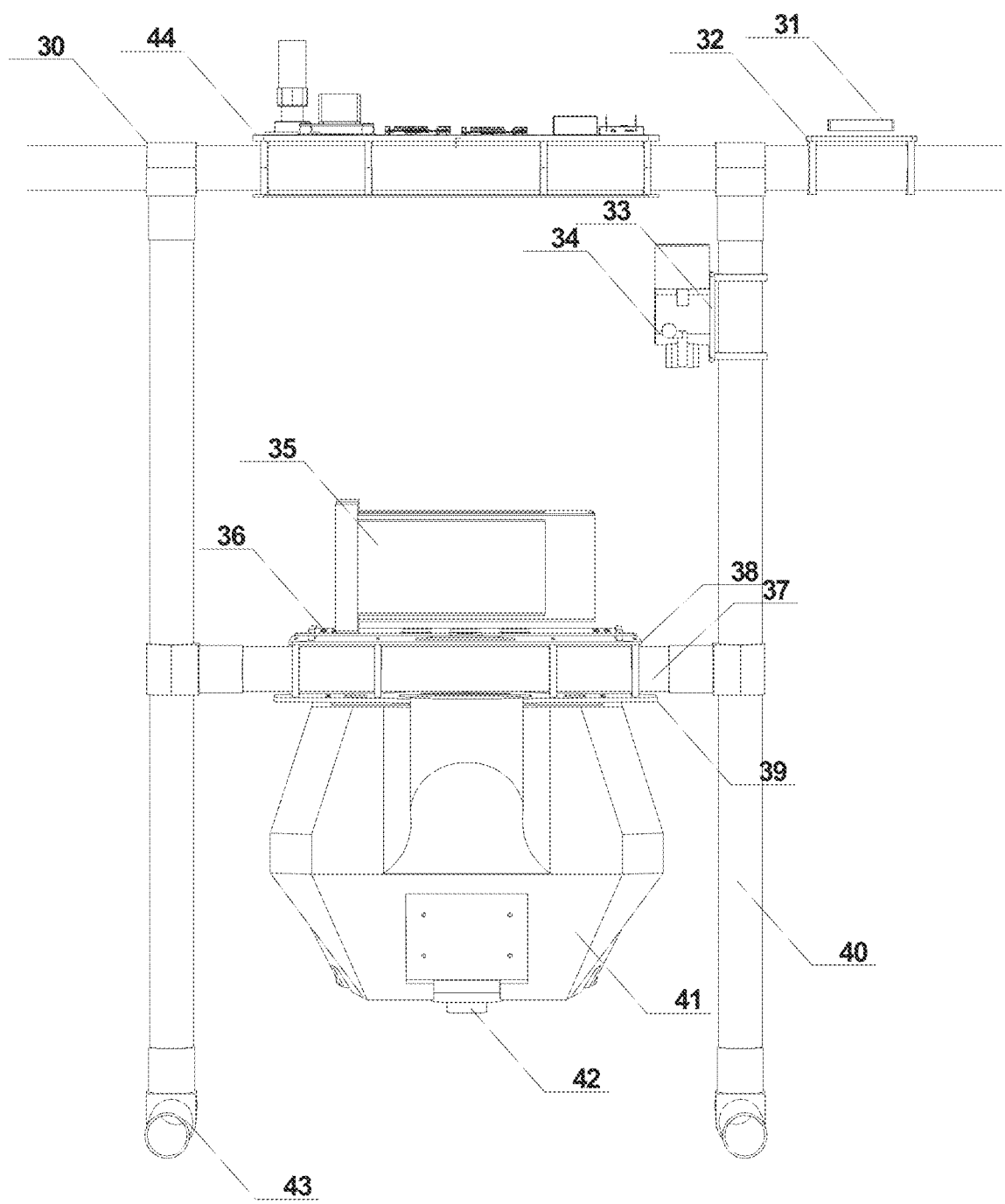
FIG. 5 is a schematic diagram of the main frame structure according to the present disclosure.
Figure 6:
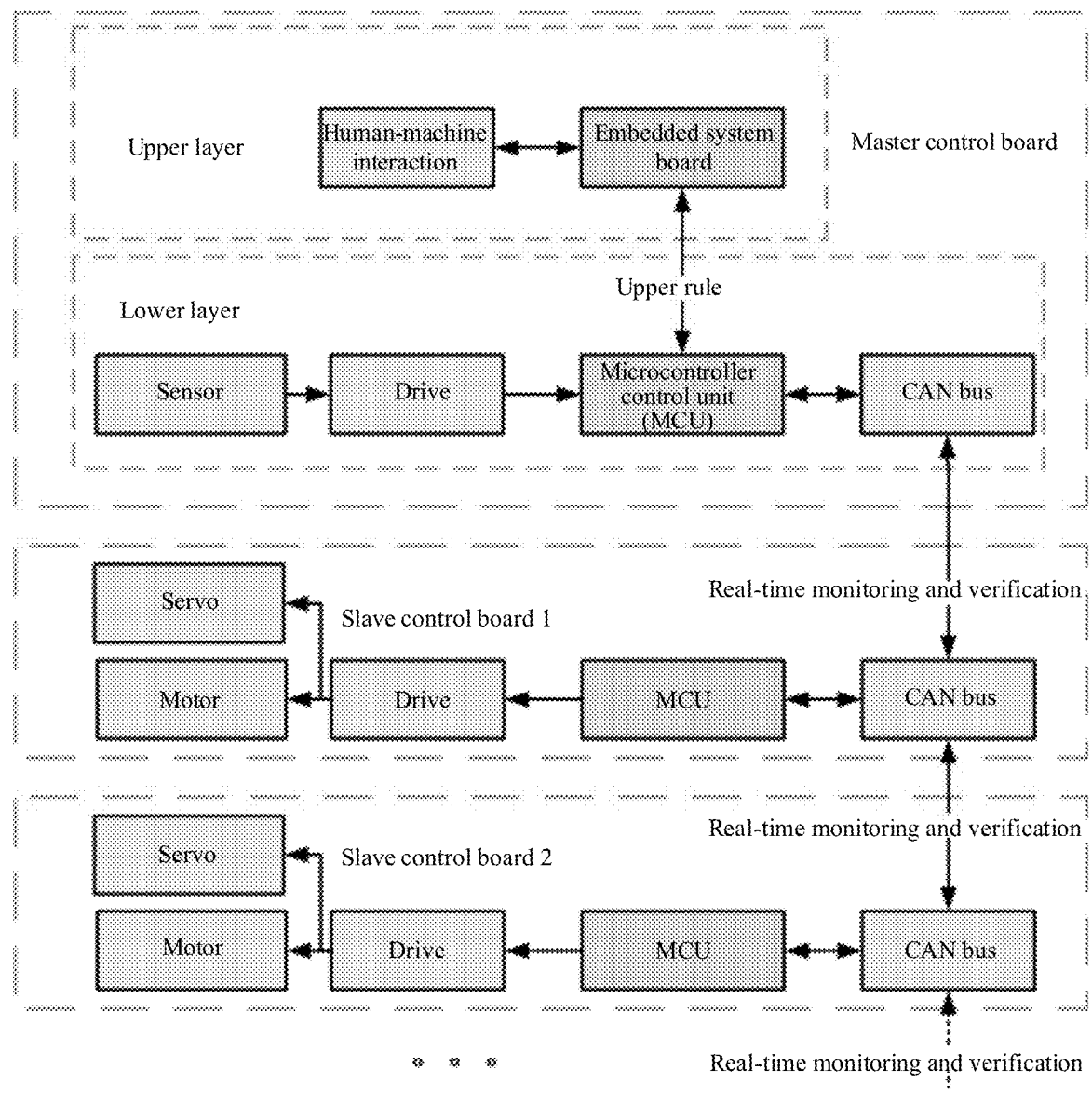
FIG. 6 is a schematic diagram of a master-slave interactive control according to the present disclosure.

FIG. 5 is a schematic diagram of the main frame structure according to the present disclosure. The two undercarriage carbon tubes 40 are fixedly connected to the main rod 9 through the tees 30. The two fixed carbon plates 44 are fixed to the main rod 9 through four of the 40 mm tube clamps 5, screws, and nuts. The water pump fixing plate 33 is fixed to one of the undercarriage carbon tubes 40 through two of the 40 mm tube clamps 5, and is provided with a water pump 34 positioning and mounting hole for convenience of fixing the water pump 34. The small battery 31 is bound to the small battery fixing plate 32 through a battery strap for convenience of quick replacement. The small battery fixing plate 32 is fixed to the main rod 9 through two of the 40 mm tube clamps 5. The latch plate 38 and the water tank fixing plate 39 are provided with same tube clamp positioning holes, and are fixed to the crossbar 37 through four of the 40 mm tube clamps 5. The crossbar 37 is connected to the undercarriage carbon tubes 40 through the tees 30. The latch plate 38 is provided with a sliding groove structure, and a positioning hole for lifting and pulling a latch, for convenience of quick battery replacement. The onboard battery 35 serves as a main power supply module of the UAV, and is fixed to the battery fixing plate 36 through a battery tie. The battery fixing plate 36 is connected to the latch plate 38 through a sliding groove. The water tank fixing plate 39 is provided with a water tank 41 positioning and mounting hole for convenience of fixing the water tank. The water level gauge 42 is located at a bottom of the water tank 41, and is configured to measure a water level of the water tank based on an ultrasonic principle. The two undercarriage carbon tubes 40 are respectively fixedly connected to the landing carbon tubes 43 through two of the tees 30 for landing cushioning of the UAV FIG. 6 is a schematic diagram of a master-slave interactive control according to the present disclosure. The present disclosure adopts a master-slave control strategy based on controller area network (CAN) communication to address a problem that a control signal is easy to lose due to an excessively long body of the unmanned aerial vehicle. The present disclosure designs algorithms for real-time detection and verification to ensure stable and reliable control signals of the UAV during flight. The control board 26 is a master control board responsible for perception, computation, and control. The tilt slave-control circuit board 11 receives commands from the master control board through a CAN bus to directly control the motor and the servo to make corresponding actions. They implement monitoring and verification in real time. When the master-control board discovers that a slave-control board is missing, it provides alarm information to the user through human-machine interaction via an upper embedded system board. When the slave control boards 1 and 2 (main lift slave-control circuit boards 8) discover that the master-control board (control board 26) is missing, they immediately enter a protection mechanism to stop all motor and servo controls, to prevent accidental actions from harming personnel's safety.

Figure 7:
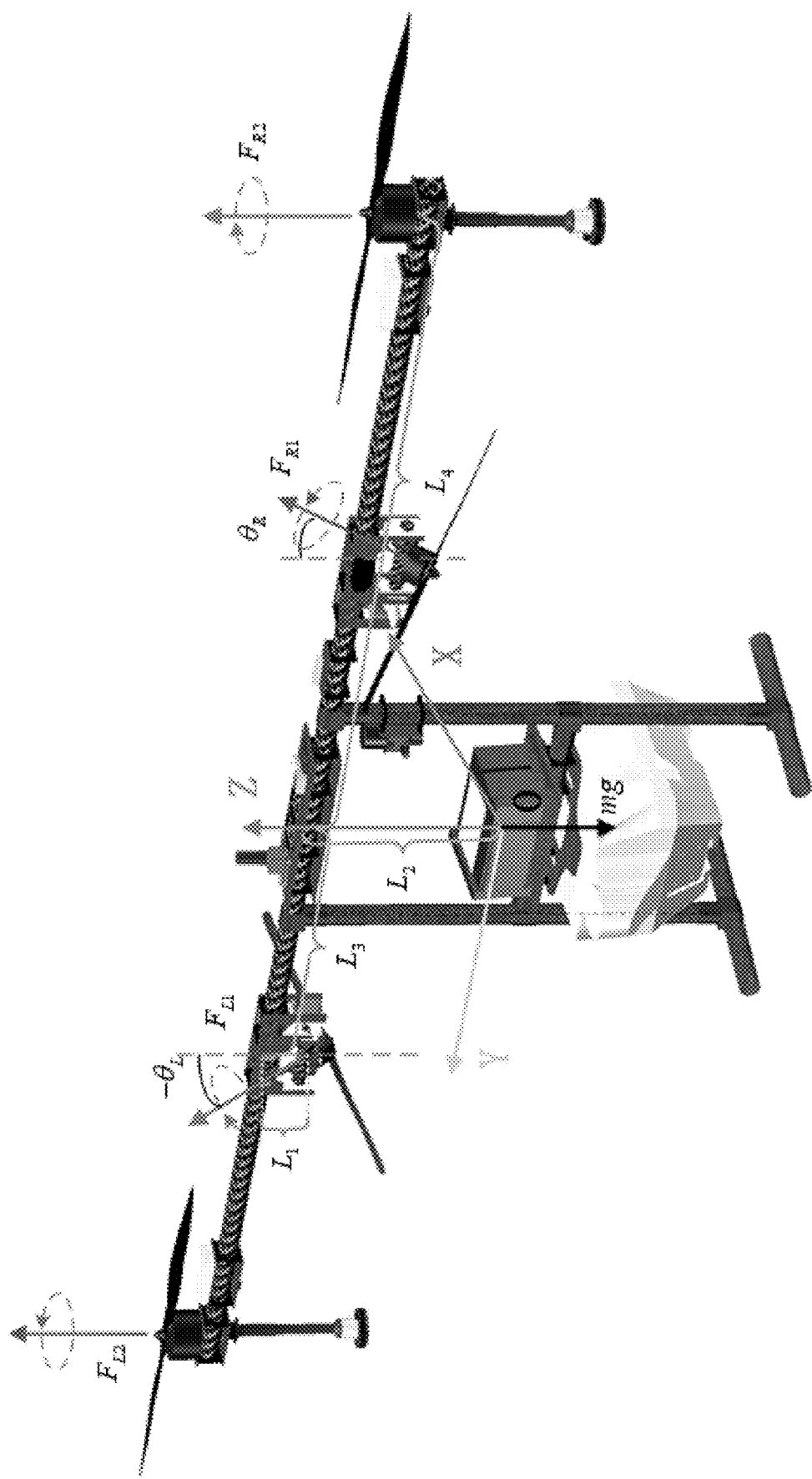
FIG. 7 is a dimensional diagram of a dynamic model according to the present disclosure.

FIG. 7 is a dimensional diagram of a dynamic model according to the present disclosure. The present disclosure uses Euler angles θ, φ, ψ to describe the attitude of the UAV, that is, angles between a body frame and a ground inertial frame. The ground inertial frame takes an East-North-Up (ENU) coordinate system. A center of mass of the tilt rotor-based linear multi-rotor UAV serves as an origin of the body frame, with an X-axis perpendicular to an arm and pointing towards a nose, a Y-axis parallel to the arm and pointing towards a left side of the nose, and a Z-axis perpendicular to the arm and pointing upwards. In FIG. 7, a length of the tilt motor from the main rod is denoted as $L_1$, a length of a center of gravity of the main rod is denoted as $L_2$, a length of a tilt arm of force is denoted as $L_3$, a length of a main lift arm of force is denoted as $L_4$, a thickness of the motor is denoted as $L_5$, and deviation angles of left and right servos from a vertical position are respectively denoted as $\theta_L$ and $\theta_R$ (observed in the +Y direction, clockwise rotation indicates positive). A total mass of the UAV is denoted as m, and a gravitational acceleration is denoted as g. The present disclosure conducts dynamic analysis based on a three-axis torque $T=[T^\theta\ T^\varphi\ T^\psi]T$ of the body frame and a lift $F=[F_{L2}\ F_{L1}\ F_{R1}\ F_{R2}]T$ generated by the four rotors, and acquires a three-axis rotational dynamic model below.

$$\begin{bmatrix} T_\theta \\ T_\varphi \\ T_\psi \end{bmatrix} = \begin{bmatrix} 0 & \sin\theta_L(-L_1+L_2-L_5\cos\theta_L) & \sin\theta_R(-L_1+L_2-L_5\cos\theta_R) & 0 \\ L_4 & L_3\cos\theta_L + k_{torque}\sin\theta_L & -L_3\cos\theta_R - k_{torque}\sin\theta_R & -L_4 \\ -k_{torque} & L_3\sin\theta_L + k_{torque}\cos\theta_L & -L_3\sin\theta_R - k_{torque}\cos\theta_R & k_{torque} \end{bmatrix} \begin{bmatrix} F_{L2} \\ F_{L1} \\ F_{R1} \\ F_{R2} \end{bmatrix}$$

$K_{torque}$ denotes a reaction torque coefficient of air, reflecting a relationship between the lift generated by rotor rotation and a reaction torque generated by air friction.

A three-axis translational dynamic model of the UAV is established below.

$$\begin{bmatrix} \dot{v}_x \\ \dot{v}_y \\ \dot{v}_z \end{bmatrix} = -g\begin{bmatrix} 0 \\ 0 \\ 1 \end{bmatrix} + \frac{1}{m}R_b^e \begin{bmatrix} 0 & \sin\theta_L & \sin\theta_R & 0 \\ 0 & 0 & 0 & 0 \\ 1 & \cos\theta_L & \cos\theta_R & 1 \end{bmatrix} \begin{bmatrix} F_{L2} \\ F_{L1} \\ F_{R1} \\ F_{R2} \end{bmatrix}$$

where, $R_b^e$ denotes a rotation matrix from the body frame to the ground inertial frame.

Figure 9:
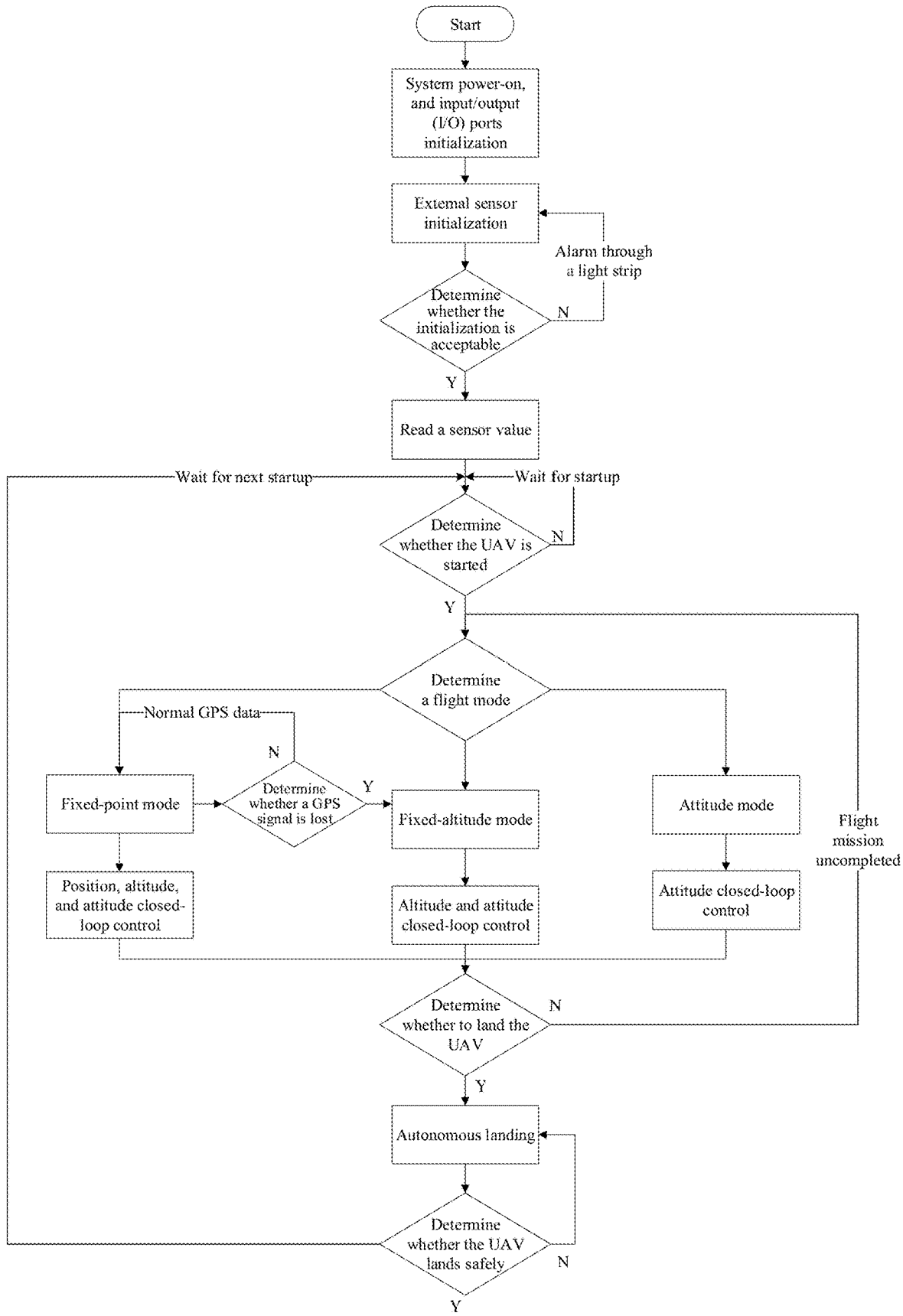
FIG. 9 is a flowchart of a control method according to the present disclosure.

FIG. 9 is a flowchart of a control method according to the present disclosure. The control method includes the following steps.

Step 1. A master control chip and an external sensor are initialized.

Step 2. Self-check of the external sensor of the UAV is performed. If the self-check indicates that the external sensor is not normal, an alarm is displayed through an external light strip, and step 2 is repeated. If the self-check indicates that the external sensor is normal, the control method proceeds to step 3.

Step 3. The control method waits for human-machine interactive unlocking such that the UAV switches from a self-locked state to a state of waiting for takeoff.

Step 4. Human-machine interaction data are received, and the UAV is switched among different missions, specifically among an attitude mode, a fixed-altitude mode, a fixed-point mode, and a one-click landing mode. The UAV is forcibly switched from the fixed-point mode to the fixed-altitude mode when a GPS signal is weak or lost. The UAV reads and controls information concerning an attitude angle and an angular speed in the attitude mode. The UAV reads and controls information concerning the attitude angle, the angular speed, a speed, and a flight altitude in the fixed-altitude mode. The UAV reads and controls information concerning the attitude angle, the angular speed, the speed, and a position in the fixed-point mode, and implements track planning and tracking functions. The UAV ends a current mission and slowly descends in place in the one-click landing mode.

Figure 8:
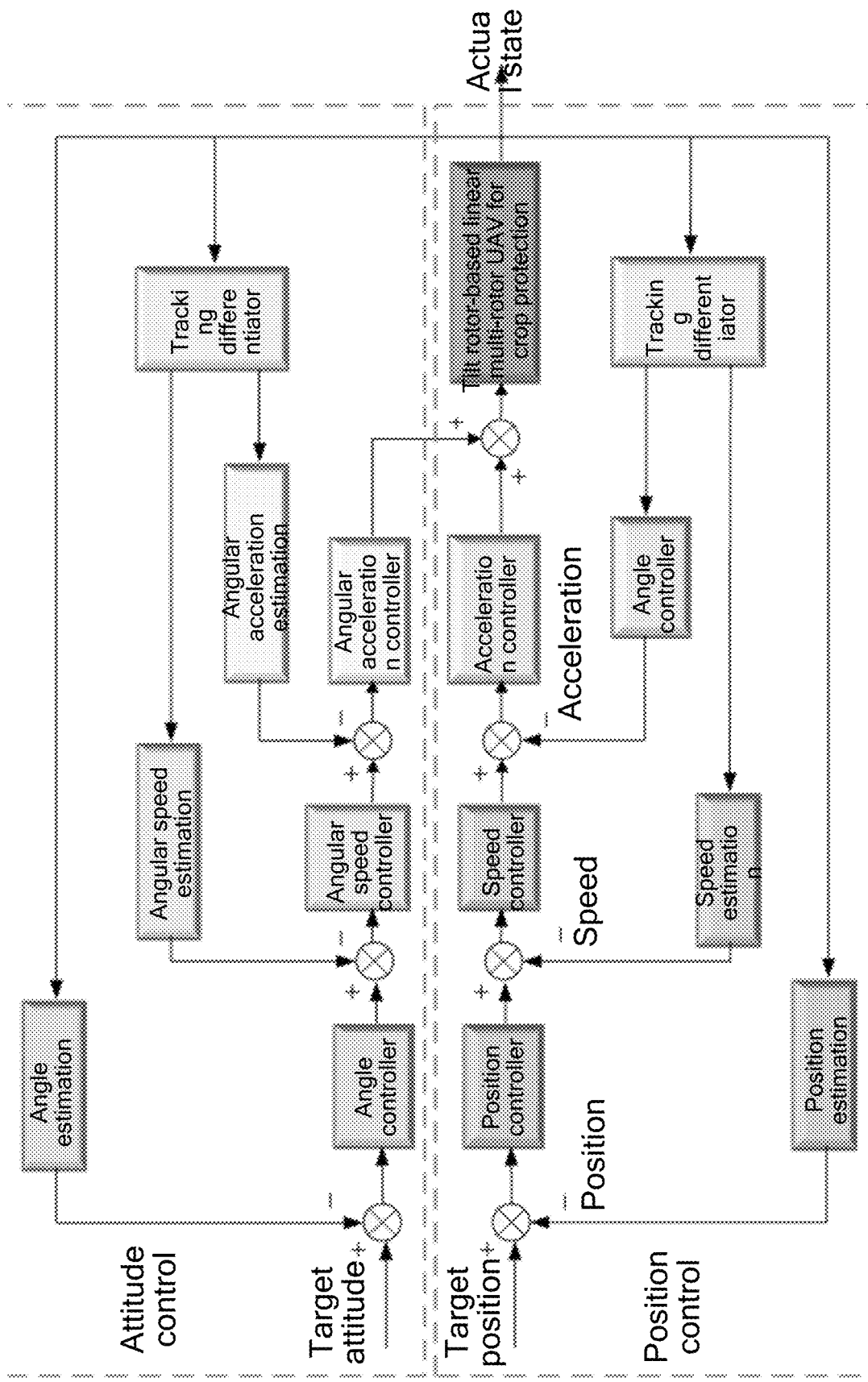
FIG. 8 is a block diagram of a control system according to the present disclosure.

FIG. 8 is a block diagram of a control system according to the present disclosure. According to the dynamic models of the tilt rotor-based linear multi-rotor UAV for crop protection established in step 7, the control mode is a composite control mode combining PID and ADRC and combining cascade control and parallel control. The linear multi-rotor UAV for crop protection can directly acquire a corresponding force in an X-direction by adjusting the tilt rotor, not like an ordinary multi-rotor UAV that can only acquire the force by adjusting a corresponding attitude angle. In the present disclosure, the control mode specifically divides an attitude control and a position control of the linear multi-rotor UAV for crop protection into two independent control systems. Each control structure adopts a cascade feedback control, and two control results are combined to form a parallel control. The attitude control is implemented through an angle controller, an angular speed controller, and an angular acceleration controller in cascade. Angle data and angular speed data are estimated by an integrated navigation algorithm. Angular acceleration data is estimated by a differential tracker in the ADRC algorithm. Similar to the attitude control, the position control is implemented through a position controller, a speed controller, and an acceleration controller in cascade. Position information and speed information are estimated by the integrated navigation algorithm, while acceleration information is estimated by the differential tracker. The present disclosure adopts the master-slave control strategy above based on CAN communication to address a problem that a control signal is easy to lose due to an excessively long body of the unmanned aerial vehicle.

Step 5. The system control is turned off after the UAV safely lands, and the control method returns to the step 3.

What is claimed is:

1. A tilt rotor-based linear multi-rotor unmanned aerial vehicle structure for a crop protection, comprising main lift power structures, tilt power structures, and a main frame structure, wherein the main frame structure is located in a middle; the main lift power structures are distributed at left and right ends of the main frame structure; and the tilt power structures are symmetrically distributed between the main frame structure and the main lift power structures;

the main lift power structures each comprise a main lift blade, a main lift motor, a main lift motor fixing plate, a main lift electronic speed controller, first tube clamps, a centrifugal nozzle, two slave-control fixing plates, a main lift slave-control circuit board, and a main rod; the main lift blade is screwed to the main lift motor; the main lift motor is screwed to the main lift motor fixing plate, is clamped through the first tube clamps, and is fixed to the main rod together with the centrifugal nozzle below; the main lift electronic speed controller and the main lift slave-control circuit board are respectively fixed to the two slave-control fixing plates, and are fixed to the main rod through the first tube clamps; the main lift slave-control circuit board is configured to receive a command from a control board and provide a signal to the main lift electronic speed controller to drive the main lift motor to rotate; and the centrifugal nozzle is internally integrated with a motor speed controller, and directly drives a speed control through a pulse width modulation (PWM) signal received from the main lift slave-control circuit board;

the tilt power structures each comprise two tilt carbon plates, a tilt slave-control circuit board, a servo fixing aluminum part, a servo, a tilt electronic speed controller, two clamping aluminum parts, second tube clamps, a tilt motor fixing plate, a bearing fixing aluminum part, a tilt carbon tube, two bearings, a tilt motor, and a tilt blade; the tilt slave-control circuit board and the tilt electronic speed controller are respectively screwed to upper parts of the two tilt carbon plates; the upper parts of the two tilt carbon plates are fixed to the main rod through the first tube clamps; the tilt carbon tube is provided at a middle part between lower ends of the two tilt carbon plates; two ends of the tilt carbon tube are fixed by the two bearings and two of the second tube clamps; the bearing fixing aluminum part is configured to fix the two bearings; the two clamping aluminum parts jointly clamp the tilt carbon tube; the tilt carbon tube is provided with a perforation such that fixing positions of the clamping aluminum parts are relatively consistent; the servo fixing aluminum part is located at a position close to an end of the tilt carbon tube; the servo fixing aluminum part is configured to fix the servo; an output shaft of the servo is nested in a groove of the clamping aluminum parts to drive the tilt carbon tube to rotate; the tilt blade is fixed to the tilt motor through a nut; and the tilt motor fixing plate is provided with a tilt motor mounting hole to connect and fix two of the second tube clamps to the tilt carbon tube; and the main frame structure comprises a level gauge, an inertial navigation module, a shock pad, the control board, a global positioning system (GPS) antenna, a program downloader, a remote control receiver, tees, a small battery, a small battery fixing plate, a water pump fixing plate, a water pump, an onboard battery, a battery fixing plate, a crossbar, a latch plate, a water tank fixing plate, two undercarriage carbon tubes, a water tank, a water level gauge, landing carbon tubes, and two fixed carbon plates; the inertial navigation module, the program downloader, the remote control receiver, and the water level gauge are connected to the control board through an interface on the control board to transmit data to the control board; the small battery is configured to supply power to the control board and a sensor through a battery interface on the control board; the level gauge, the shock pad, the control board, the GPS antenna, the program downloader, and the remote control receiver are screwed and hard-wired to the two fixed carbon plates; the two undercarriage carbon tubes are fixedly connected to the main rod through the tees; the two fixed carbon plates are fixed to the main rod through four of the first tube clamps, screws, and nuts; the water pump fixing plate is fixed to one of the undercarriage carbon tubes through two of the first tube clamps, and is provided with a water pump positioning and mounting hole for convenience of fixing the water pump; the small battery is bound to the small battery fixing plate through a battery strap for convenience of a quick replacement; the small battery fixing plate is fixed to the main rod through two of the first tube clamps; the latch plate and the water tank fixing plate are provided with same tube clamp positioning holes, and are fixed to the crossbar through four of the first tube clamps; the crossbar is connected to the undercarriage carbon tubes through the tees; the onboard battery serves as a main power supply module of an unmanned aerial vehicle, and is fixed to the battery fixing plate through a battery tie; the battery fixing plate is connected to the latch plate through a sliding groove; the water tank fixing plate is provided with a water tank positioning and mounting hole for convenience of fixing the water tank; the water level gauge is located at a bottom of the water tank, and is configured to measure a water level of the water tank based on an ultrasonic principle; and the two undercarriage carbon tubes are respectively fixedly connected to the landing carbon tubes through two of the tees for landing cushioning of the unmanned aerial vehicle.

2. The tilt rotor-based linear multi-rotor unmanned aerial vehicle structure for the crop protection according to claim 1, wherein the clamping aluminum parts each adopt a long rudder arm structure to effectively reduce gear wear caused by a high-frequency rotation of the servo; and the two tilt carbon plates offer a space to facilitate a 360-degree rotation of the clamping aluminum parts connected to the servo.

3. The tilt rotor-based linear multi-rotor unmanned aerial vehicle structure for the crop protection according to claim 1, wherein the inertial navigation module is bonded to the shock pad through a three-layer damping material; the level gauge is configured for a zero deviation calibration of an initial angle of the unmanned aerial vehicle; the GPS antenna is provided for the inertial navigation module to receive global navigation satellite system (GNSS) data; the program downloader is configured for a software testing of the unmanned aerial vehicle; and the remote control receiver is configured for receiving a remote control command and transmitting data to the control board.

4. The tilt rotor-based linear multi-rotor unmanned aerial vehicle structure for the crop protection according to claim 1, wherein the latch plate is provided with a sliding groove structure, and a positioning hole for lifting and pulling a latch, for convenience of a quick battery replacement.

5. A control method of the tilt rotor-based linear multi-rotor unmanned aerial vehicle structure for the crop protection according to claim 1, comprising the following steps:

step 1: establishing a three-axis rotational dynamic model and a three-axis translational dynamic model of the unmanned aerial vehicle separately;

step 2: initializing a master control chip and an external sensor;

step 3: performing a self-check of the external sensor of the unmanned aerial vehicle;

displaying an alarm through an external light strip and repeating the step 3 if the self-check indicates that the external sensor is not normal; and proceeding to step 4 if the self-check indicates that the external sensor is normal;

step 4: waiting for a human-machine interactive unlocking such that the unmanned aerial vehicle switches from a self-locked state to a state of waiting for takeoff;

step 5: receiving human-machine interaction data, and switching the unmanned aerial vehicle among different missions, specifically among an attitude mode, a fixed-altitude mode, a fixed-point mode, and a one-click landing mode; forcibly switching the unmanned aerial vehicle from the fixed-point mode to the fixed-altitude mode when a GPS signal is weak or lost; allowing the unmanned aerial vehicle to read and control information concerning an attitude angle and an angular speed in the attitude mode; allowing the unmanned aerial vehicle to read and control information concerning the attitude angle, the angular speed, a speed, and a flight altitude in the fixed-altitude mode; allowing the unmanned aerial vehicle to read and control information concerning the attitude angle, the angular speed, the speed, and a position, and implement track planning and tracking functions in the fixed-point mode; allowing the unmanned aerial vehicle to end a current mission and slowly descend in place in the one-click landing mode; adopting a composite control mode combining a proportional-integral-derivative (PID) control and an auto-disturbance rejection control and combining a cascade control and a parallel control, according to dynamic models of the unmanned aerial vehicle established in the step 1; and adopting a master-slave control strategy based on a controller area network (CAN) communication to address a problem that a control signal is easy to lose due to an excessively long body of the unmanned aerial vehicle; and step 6: turning off a system control after the unmanned aerial vehicle safely lands, and returning to the step 4.

* * * * *